(12) United States Patent
Xu et al.

(10) Patent No.: US 10,568,110 B2
(45) Date of Patent: Feb. 18, 2020

(54) APPARATUS AND METHOD FOR WIRELESS COMMUNICATIONS, BASE STATION, AND APPARATUS AT USER EQUIPMENT SIDE

(71) Applicant: SONY CORPORATION, Tokyo (JP)

(72) Inventors: Xiaodong Xu, Beijing (CN); Ce Wang, Beijing (CN); Yunqiu Xiao, Beijing (CN); Chengcheng Yang, Beijing (CN)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 15/560,630

(22) PCT Filed: Oct. 23, 2015

(86) PCT No.: PCT/CN2015/092699
§ 371 (c)(1),
(2) Date: Sep. 22, 2017

(87) PCT Pub. No.: WO2016/155296
PCT Pub. Date: Oct. 6, 2016

(65) Prior Publication Data
US 2018/0063855 A1    Mar. 1, 2018

(30) Foreign Application Priority Data

Mar. 30, 2015 (CN) .......................... 2015 1 0144283

(51) Int. Cl.
*H04W 72/12* (2009.01)
*H04W 72/04* (2009.01)
(52) U.S. Cl.
CPC .......... *H04W 72/12* (2013.01); *H04W 72/042* (2013.01)
(58) Field of Classification Search
CPC .. H04W 72/12; H04W 72/121; H04W 72/042
See application file for complete search history.

(56) References Cited

U.S. PATENT DOCUMENTS

2006/0268798 A1* 11/2006 Kim .................. H04W 72/1278
  370/338
2014/0003262 A1* 1/2014 He ....................... H04W 28/08
  370/252
(Continued)

FOREIGN PATENT DOCUMENTS

CN       102088736 A     6/2011
CN       102123496 A     7/2011
(Continued)

OTHER PUBLICATIONS

International Search Report dated Jan. 4, 2016 in PCT/CN2015/092699 filed Oct. 23, 2015.
(Continued)

*Primary Examiner* — Jae Y Lee
(74) *Attorney, Agent, or Firm* — Xsensus, LLP

(57) ABSTRACT

An apparatus and method for wireless communications, a base station, and a user equipment side apparatus in a communication system. The wireless communications apparatus includes: one or more scheduling units configured to, responsive to transmission demands of plural user equipments managed by the apparatus, judge, based on user equipment clusters to which the plural user equipments belongs, whether the plural user equipments can reuse same physical transmission resources or not, and schedule, based on a judgment result, corresponding physical transmission resources for the plural user equipments; and a signaling generating unit configured to generate, based on resource scheduling of one or more scheduling units, downlink control information containing resource scheduling information to apply same to the plural user equipments, the user equipments including D2D user equipment pairs and honeycomb user equipments, the plural user equipments being (Continued)

divided into at least one user equipment cluster in advance based on geographic positions.

14 Claims, 13 Drawing Sheets

(56) References Cited

U.S. PATENT DOCUMENTS

| | | |
|---|---|---|
| 2015/0319796 A1 | 11/2015 | Lu et al. |
| 2016/0205713 A1* | 7/2016 | Seo ....................... H04W 76/14 370/280 |
| 2016/0309396 A1* | 10/2016 | Chai ..................... H04W 16/28 |
| 2016/0323922 A1* | 11/2016 | Park ..................... H04W 24/10 |

FOREIGN PATENT DOCUMENTS

| | | |
|---|---|---|
| CN | 102244873 A | 11/2011 |
| CN | 103533529 A | 1/2014 |
| JP | 2009-509386 A | 3/2009 |
| WO | 2014/017476 A1 | 1/2014 |
| WO | 2014/089791 A1 | 6/2014 |
| WO | 2014/126022 A1 | 8/2014 |
| WO | 2014/126255 A1 | 8/2014 |
| WO | 2014/176782 A1 | 11/2014 |

OTHER PUBLICATIONS

Japanese Office Action dated May 7, 2019 in corresponding Japanese Application No. 2017-548293.

* cited by examiner

| Cluster 1 | Cluster 2 | Cluster 3 |  | Cluster 11 | Cluster 12 |
|---|---|---|---|---|---|
| DUE-P 1 | DUE-P 2 | DUE-P 3 |  | DUE-P 11 | DUE-P 12 |
| DUE-P 13 | DUE-P 14 | DUE-P 15 |  | DUE-P 23 | DUE-P 24 |
| DUE-P 25 | DUE-P 26 | CUE 3 |  | CUE 11 | CUE 12 |
| DUE-P 27 | CUE 2 | ... |  | ... | ... |
| CUE 1 | ... |  |  |  |  |
| ... |  |  |  |  |  |

| DUE-P 1 | DUE-P2 | DUE-P15 | | CUE 11 | DUE-P 12 |

APPARATUS AND METHOD FOR WIRELESS COMMUNICATIONS, BASE STATION, AND APPARATUS AT USER EQUIPMENT SIDE

FIELD OF THE INVENTION

The embodiments of the present disclosure relate to the field of wireless communications, in particular to physical transmission resources scheduling for a user equipment in wireless communications, and in more particular to an apparatus and a method for wireless communications, a base station including the apparatus and an apparatus on a user equipment side.

BACKGROUND OF THE INVENTION

In the case that there are D2D user equipment pairs and cellular user equipments in a wireless communication system, the D2D user equipment pairs multiplex physical transmission resources for the cellular user equipments, and thus interferences may occur between the D2D user equipment pairs and the cellular user equipments. Similarly, interferences may also occur between the D2D user equipment pairs using the same physical transmission resources.

Therefore, it is desired to reduce the above two types of interference as much as possible while improving the resource utilization efficiency.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

An apparatus for wireless communications is provided according to an aspect of the present disclosure. The apparatus includes: one or more scheduling units, configured to: in response to transmission requirements of a plurality of user equipments managed by the apparatus, determine, based on user equipment clusters which the plurality of user equipments belong to, whether the plurality of user equipments are capable of multiplexing same physical transmission resources, and schedule physical transmission resources for the plurality of user equipments based on a result of the determining; and a signaling generating unit, configured to generate, based on the resources scheduling of the one or more scheduling units, downlink control information containing resource scheduling information to be used for the plurality of user equipments, wherein the user equipments include D2D user equipment pairs and cellular user equipments, and the plurality of user equipments are grouped into at least one user equipment cluster based on geographical locations in advance.

A method for wireless communications is provided according to another aspect of the present disclosure. The method includes: in response to transmission requirements of a plurality of user equipments, determining, based on user equipment clusters which the plurality of user equipments belong to, whether the plurality of user equipments are capable of multiplexing same physical transmission resources; scheduling physical transmission resources for the plurality of user equipments based on a result of the determining; and generating, based on the resources scheduling, downlink control information containing resource scheduling information to be used for the plurality of user equipments; wherein the user equipments include D2D user equipment pairs and cellular user equipments, and the plurality of user equipments are grouped into at least one user equipment cluster based on geographical locations in advance.

A base station including the above apparatus is provided according to another aspect of the present disclosure.

An apparatus on a user equipment side in a communication system is provided according to yet another aspect of the present disclosure. The apparatus includes: one or more processors, configured to parse control signaling from a base station and determine a DP-RNTI for the apparatus, and perform blind detection on a physical downlink control channel (PDCCH) from the base station using the DP-RNTI, to detect downlink control information for the apparatus and determine physical transmission resources scheduled by the base station for the apparatus, wherein the physical transmission resources are used for a D2D communication between the user equipment and another user equipment, and the user equipment and at least another D2D user equipment managed by the base station share the DP-RNTI.

Computer program codes and a computer program product for implementing the above method for wireless communications, and a computer readable storage medium on which the computer program codes for implementing the above method for wireless communications are recorded are further provided according to other aspects of the present disclosure.

With the apparatus and method for wireless communications according to the present disclosure, the physical transmission resources are scheduled for both the D2D user equipment pairs and the cellular user equipments uniformly, thereby achieving at least one of the technical effects: improving the resource utilization efficiency and reducing the interferences.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1:
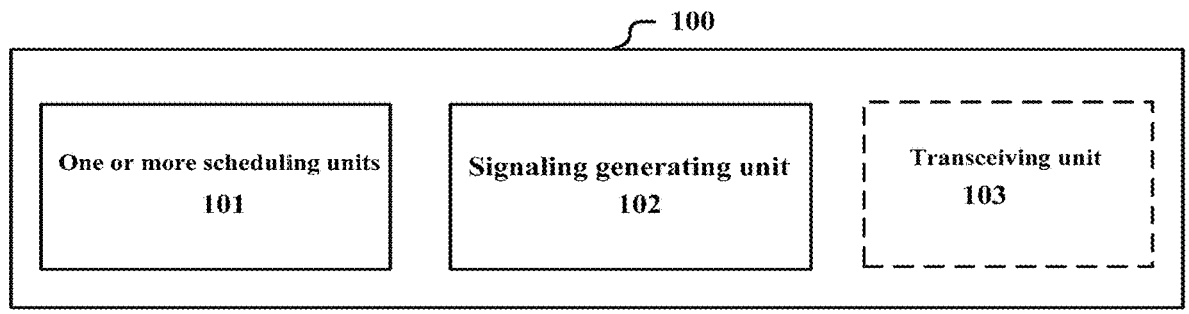
FIG. 1 is a structural block diagram showing an apparatus for wireless communications according to an embodiment of the present application.

FIG. 1 is a structural block diagram showing an apparatus 100 for wireless communications according to an embodiment of the present application. The apparatus 100 includes: one or more scheduling units 101, configured to: in response to transmission requirements of multiple user equipments managed by the apparatus, determine, based on user equipment clusters which the multiple user equipments belong to, whether the multiple user equipments are capable of multiplexing same physical transmission resources, and schedule corresponding physical transmission resources for the multiple user equipments based on a result of the determining; and a signaling generating unit 102, configured to generate, based on the resources scheduling of the one or more scheduling units, downlink control information containing resource scheduling information, to be used for the multiple user equipments. The user equipments include D2D user equipment pairs and cellular user equipments, and the multiple user equipments are grouped into at least one user equipment cluster based on geographical locations in advance.

For example, in cellular mobile communications, the apparatus 100 may be a base station device such as an eNB or a relay node in rel-10. In addition, although an example that the apparatus 100 is a base station device is shown here, the apparatus 100 is not limited thereto. For example, the apparatus 100 may also be a baseband cloud device in a Cloud-RAN/Centralized-RAN (C-RAN) structure (there may be no concept of cell), such as any BBU in a high-speed interconnected BBU pool under the C-RAN architecture. Herein, the user equipment is, for example, a mobile terminal, a vehicle, a smart wearable device or the like.

Figure 2:
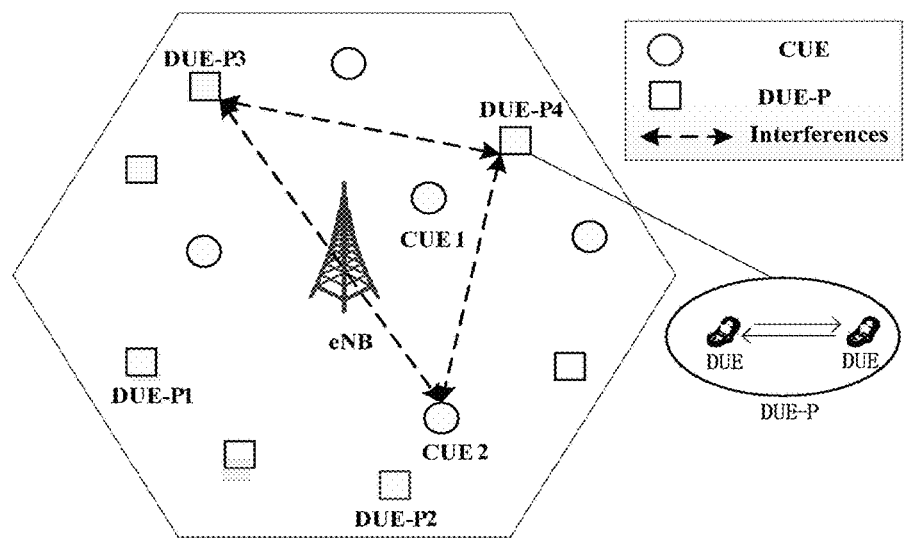
FIG. 2 is a schematic diagram showing an example of allocating resources in units of a D2D user equipment pair.

In some examples of the present disclosure, assuming that D2D user equipments each support unicast communication, user equipments constitute a D2D user equipment pair once a request for establishing D2D communication from the user equipments is allowed by the base station. Only one user equipment of the D2D user equipment pair sends data at the same time. Therefore, physical transmission resources may be allocated (or scheduled) in units of "D2D user equipment pairs". FIG. 2 is a schematic diagram showing an example of allocating resources in units of D2D user equipment pairs. In FIG. 2, a circle represents a cellular user equipment (CUE), a square represents a D2D user equipment pair (DUE-P), and resources are allocated to UEs by an eNB.

For example, the one or more scheduling units 101 may be dynamic resource schedulers defined in the LTE standard (36.300 11 Scheduling and Rate Control). For example, uplink transmission resources and downlink transmission resources may be respectively scheduled by different dynamic resource schedulers.

A transmission requirement of a user equipment may be an uplink transmission requirement determined based on a scheduling request (Scheduling Request) sent by the user equipment, or may be a downlink transmission requirement of the user equipment determined autonomously by the base station. The one or more scheduling units 101 schedule corresponding uplink physical transmission resources for the user equipment in response to the uplink transmission requirement, and/or schedule corresponding downlink physical transmission resources for the user equipment in response to the downlink transmission requirement. Accordingly, in some examples, the scheduling unit includes an uplink scheduling unit and a downlink scheduling unit.

In the embodiment, the user equipments include both the D2D user equipment pairs and the cellular user equipments. The user equipments are grouped into at least one user equipment cluster based on geographical locations in advance, a specific way of grouping is to be described in detail hereinafter. Therefore, the one or more scheduling units 101 schedules the physical transmission resources for the D2D user equipment pairs and the cellular user equipments uniformly. It should be noted that, the D2D user equipment here may also operate as a cellular user equipment and performs, for example, cellular communication related to control information transmission with the base station.

During the scheduling, firstly, the one or more scheduling units 101 determines, based on user equipment clusters to which the user equipments belong, whether multiple user equipments are capable of multiplexing the same physical transmission resources. For example, the determining may be performed based on a principle that interferences between user equipments are as small as possible. Besides, the determining may also be performed based on a current number of available resources (if the available resources are enough, the user equipments may not need to multiplex the resources), data transmission volume, a QoS requirement, and a wireless link state between a base station and the user equipment (UE).

In an example, user equipments in the same user equipment cluster use physical transmission resources orthogonal to one another, and user equipments in different user equipment clusters multiplex the same physical transmission resources. In practice, the manner of determining is not limited thereto. For example, in the case that UEs which are located in a same cluster originally are allocated to different clusters and are re-clustered, the UEs in the same cluster may multiplex the same physical transmission resources.

Since the user equipment clusters are divided in advance based on the geographical locations, when performing determination as to whether the user equipments are capable of multiplexing the same physical transmission resources based on the user equipment clusters to which the user equipments belong to, an effect of the geographical locations can be taken into consideration, thereby reducing the interferences. In addition, both the cellular UE and the D2D user equipment pair are considered uniformly when allocating, thereby improving the resource utilization efficiency while reducing the interferences.

In an example, the resource scheduling includes allocating physical resource blocks. The one or more scheduling units 101 are configured to schedule same physical resource blocks for at least part of the multiple user equipments, and the signaling generating unit 102 is further configured to generate same downlink control information for the user equipments multiplexing the same physical resource blocks and map the downlink control information to same physical downlink control channel (PDCCH) resources. Here, the physical resource block is, for example, a time-frequency resource block in LTE system.

As described in the above, for example, the one or more scheduling units 101 may schedule the same physical resource blocks for user equipments located in different user equipment clusters. The signaling generating unit 102 generates downlink control information for these user equipments and maps the downlink control information to the same PDCCH resources. These user equipments may include the D2D user equipment pairs and the cellular user equipments.

As an example, the signaling generating unit 102 may be further configured to configure a same DP-RNTI for the D2D user equipment pairs multiplexing the same physical resource blocks, and scramble the downlink control information with the DP-RNTI. For example, the signaling generating unit 102 generates a common DCI for multiple D2D user equipment pairs sharing the above physical resource blocks, scrambles a Cyclic Redundancy Check (CRC) code of the DCI with the DP-RNTI, and carries the DCI on the PDCCH, to send to the D2D user equipment pairs, thereby greatly saving channel resources of the PDCCH.

Figure 3:
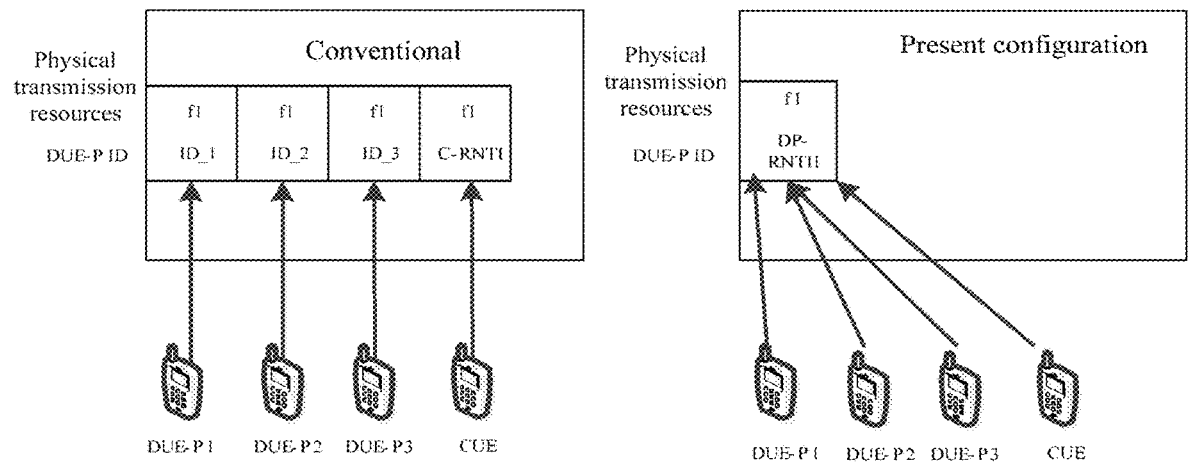
FIG. 3 is a diagram showing a comparison between a conventional PDCCH and a PDCCH using a configuration according to the present application.

In the case that the cellular user equipment and the D2D user equipment pair multiplex a resource block, the signaling generating unit 102 configures a DP-RNTI to be the same as a C-RNTI of the cellular user equipment. In this case, the cellular user equipment and the D2D user equipment pair may share channel control information (DCI) in the PDCCH, the channel control information (DCI) includes resource scheduling information of the allocated resource block. In addition, the DCI may further include power control information (such as TPC information), MCS solution and the like. FIG. 3 is a diagram showing a comparison between a conventional PDCCH and a PDCCH using the above configuration. It can be seen that, compared with the conventional PDCCH, channel resources of the PDCCH are saved in the configuration.

Figure 4:
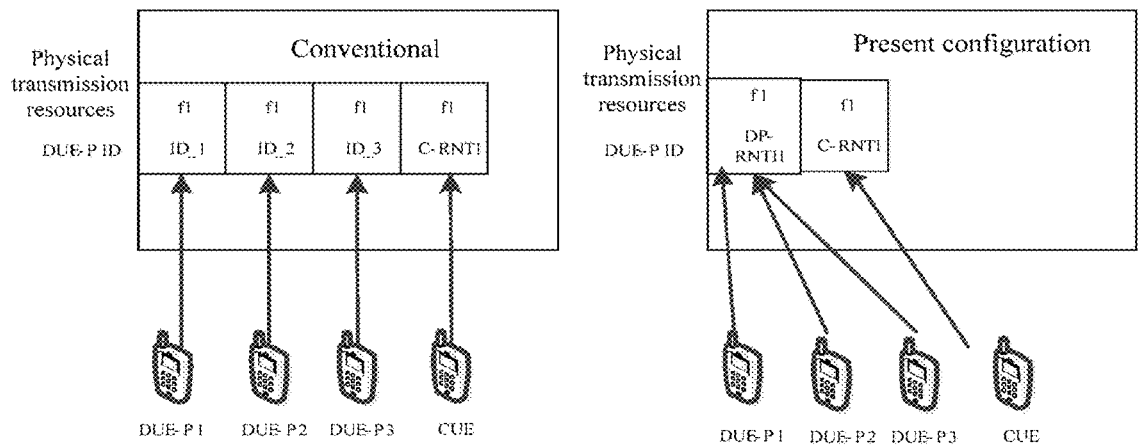
FIG. 4 is a diagram showing a comparison between a conventional PDCCH and a PDCCH using another configuration according to the present application.

In another example, even if the cellular user equipment and the D2D user equipment pair multiplex a resource block, the signaling generating unit 102 may configure a DP-RNTI to be different from a C-RNTI allocated to the cellular user equipment previously. Multiple D2D user equipment pairs share a same DP-RNTI, so that the cellular user equipment reads a DCI different from a DCI read by the D2D user equipment pairs while the multiple D2D user equipment pairs read the same DCI. For example, the same resource block is allocated to the cellular user equipment and the D2D user equipment pairs. However, power control information, MCS and the like are different for the cellular user equipment and the D2D user equipment pairs. As shown in FIG. 4, it can be seen that, even such configuration can also save channel resources of the PDCCH compared the conventional case.

Besides, as shown by a dashed-line box in FIG. 1, the apparatus 100 may further include a transceiving unit 103 configured to transmit to, the part of the user equipments, an instruction of the DP-RNTI configured therefor.

As an example, the signaling generating unit 102 is further configured to generate RRC signaling for the corresponding user equipments, and the RRC signaling contains the instruction of the DP-RNTI configured for the user equipments. The transceiving unit 103 is configured to transmit the instruction of the DP-RNTI configured for the user equipments to the user equipments by means of the RRC signaling.

In addition, the instruction of the DP-RNTI may also be carried by signaling. Accordingly, the transceiving unit 103 may transmit the instruction of the DP-RNTI to the user equipments in other manners. For example, the transceiving unit 103 may transmit the instruction of the DP-RNTI via a MAC control element (CE, control information bit), and a new MAC CE, that is, DP-RNTI MAC CE may be defined. The transceiving unit 103 may also transmit the DP-RNTI dynamically via PDCCH such as a previous PDCCH, in addition to a semi-static mode such as RRC signaling notification or MAC signaling notification. Alternatively, the transceiving unit 103 may notify the DP-RNTI by broadcasting. In this case, broadcasted information contains an ID of each of the user equipments and a DP-RNTI corresponding to the user equipment.

In the case that a location of a user equipment (i.e., a D2D user equipment pair) changes in a predetermined way, the apparatus 100 may reallocate a DP-RNTI for the user equipment. For example, if the location of the user equipment pair changes to be beyond a region of a geographical location corresponding to a user equipment cluster where the user equipment pair is originally located, the signaling generating unit 102 generates an instruction containing a new DP-RNTI configured for the user equipment pair, and the transceiving unit 103 transmits the new instruction to the user equipment pair. Besides, the one or more scheduling units 101 schedules resources based on the new DP-RNTI.

Further, the transceiving unit 103 may be further configured to receive requests for using physical transmission resources from multiple user equipments and transmit downlink control information to the multiple user equipments.

For example, the transceiving unit 103 may receive a scheduling request on a PUCCH or a random access request on a PRACH. Then, one or more scheduling units 101 schedule corresponding physical transmission resources for user equipments from which the requests are received. The signaling generating unit 102 generates downlink control information accordingly, and the transceiving unit 103 transmits the control information to the above user equipments.

In addition, the transceiving unit 103 may further receive location information reported by the user equipments. Alternatively, the transceiving unit 103 transmits a probe signal such as a PRS positioning reference signal to the user equipments and receives feedback signals from the user equipments, to determine locations of the user equipments. For example, the one or more scheduling units 102 determines a user equipment cluster to which the user equipments belong based on the location information, and then determine whether the user equipments are capable of multiplexing the same physical transmission resources.

Figures 5, 6:
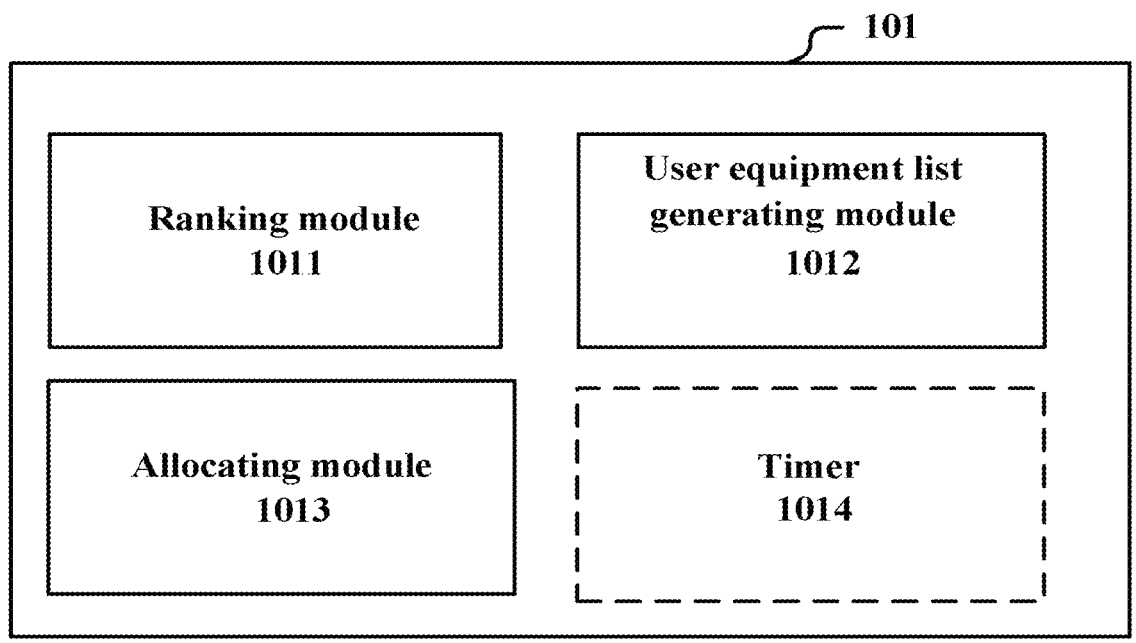
FIG. 5 is a structural block diagram showing one or more scheduling units according to an embodiment of the present application.
FIG. 6 is a diagram showing an example of user equipments which transmit requests in user equipment clusters.

A structural block diagram of an example of one or more scheduling units 101 according to an embodiment of the present disclosure is described below referring to FIG. 5. As shown in FIG. 5, the one or more scheduling units 101 includes: a ranking module 1011 configured to rank user equipments from which the requests are received according to communication priority levels of the user equipments; a user equipment list generating module 1012 configured to generate user equipment lists, the user equipments in each of which are capable of multiplexing the same physical transmission resources, where the user equipments are filled into the user equipment list based on a sequence of the priority levels; and an allocating module 1013 configured to allocate each available physical transmission resource to the user equipments in each of the generated user equipment lists.

For example, in a transmission interval (such as a subframe), the D2D user equipment pairs and the cellular user equipments may request the apparatus 100 for transmission resources. The ranking module 1011 ranks the user equipments according to communication priority levels of the user equipments (such as according to priority levels determined based on QoS requirements). The user equipment list generating module 1012 generates user equipment lists, the user equipments in each of which are capable of multiplexing the same physical transmission resources. The user equipments are filled into the user equipment list according to a descending order of the priority levels. For example, the number of the generated user equipment lists may be equal to or less than the number of available transmission resources. Then, the allocating module 1013 allocates the corresponding available physical transmission resource to the user equipments in each of the user equipment lists.

An operation example of each of the above modules are described below by taking the following determination standard as an example: user equipments in a same user equipment cluster use physical transmission resources orthogonal to one another, and user equipments in different user equipment clusters (abbreviated as a cluster hereinafter) are capable of multiplexing the same physical transmission resource.

For example, as shown in FIG. 6, assuming that there are 12 clusters, FIG. 6 lists user equipments which transmit requests in each of the clusters. The ranking module 1011 ranks the user equipments from top to bottom according to a descending order of communication priority levels of the user equipments.

Figure 7:
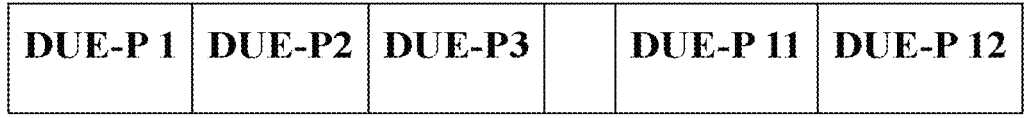
FIG. 7 is a diagram showing an example of a generated user equipment list.

The user equipment list generating module 1012 generates a user equipment list for example using the following operations. Firstly, DUE-P1 is filled into the list. DUE-P2 may be added to the list since DUE-P1 and DUE-P2 are located in different clusters. Similarly, DUE-P3, . . . , DUE-P12 may also be added to the list, so as to generate the user equipment list shown in FIG. 7. It should be noted that, this is only an example, the user equipment list generating module 1012 is not limited thereto, and may generate a user equipment list based on other or additional determination standards.

Besides, as shown by a dashed-line box in FIG. 5, the one or more scheduling units 101 may further include a timer 1014 provided for each of the available physical transmission resources. When the timer 1014 expires, the user equipment list generating module 1012 stops generating of the corresponding user equipment list, and the allocating module 1013 allocates the available physical transmission resource to user equipments in the user equipment list. The timer 1014 is provided to limit a time period for waiting and determining by the apparatus 100, thereby further accelerating a response. Specifically, different timers may be provided for different available physical transmission resources.

In summary, the apparatus 100 according to the embodiment allocate physical transmission resources to both the D2D user equipment pairs and the cellular user equipments uniformly by dividing user equipment clusters, thereby achieving at least one of: reducing the interferences, improving the resource utilization efficiency and saving channel resources of PDCCH.

Second Embodiment

Figure 8:
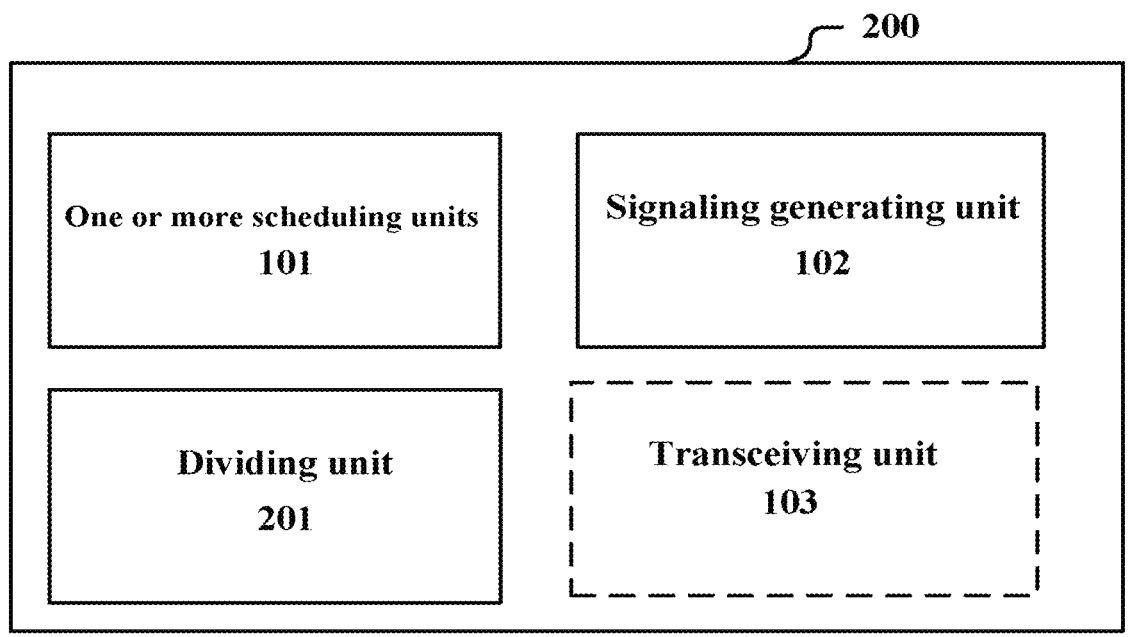
FIG. 8 is a structural block diagram showing an apparatus for wireless communications according to another embodiment of the present application.

FIG. 8 shows a structural block diagram of an apparatus 200 for wireless communications according to another embodiment of the present disclosure. In addition to the units shown in FIG. 1, the apparatus 200 further includes a dividing unit 201 configured to divide a coverage range of a base station antenna serving user equipments into multiple regions according to the geographical locations, and take the user equipments in each of the regions as one user equipment cluster.

Since there is a high probability of user equipments close in geographical locations interfering with each other, the user equipments are grouped into the same user equipment cluster, and the one or more scheduling units 101 may schedule different physical transmission resources for the user equipments, thereby reducing the interferences and improving communication quality.

Figure 9:
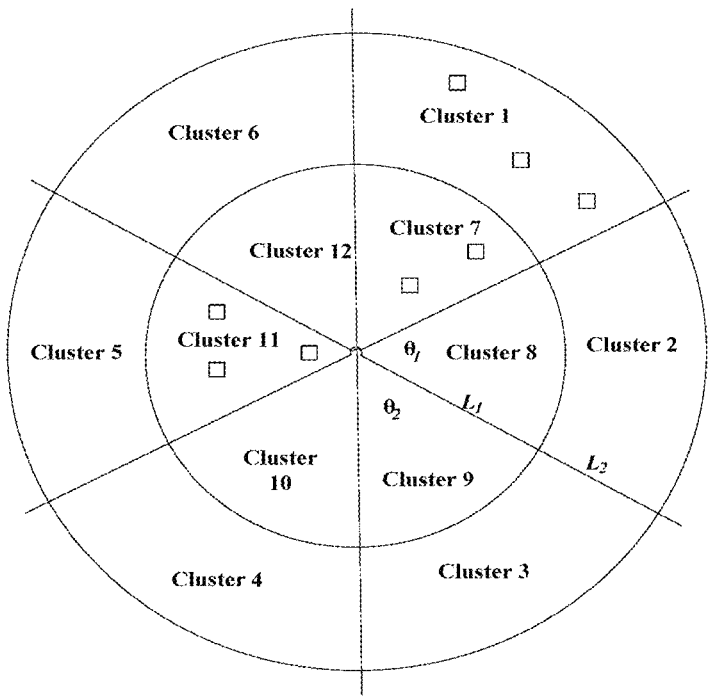
FIG. 9 is a diagram showing an example of dividing of a coverage region.

In an example, the dividing unit 201 is configured to divide the coverage range into one or more rings based on a radial length while taking a location of the base station antenna as a center, and equally divide each ring into several regions having a certain angle respectively. In other words, the dividing unit 201 divides the coverage range according to the L & θ criterion. As shown in FIG. 9, the coverage range is divided into an inner ring and an outer ring. A radial length (i.e., radius) of the inner ring is $L_1$ and a radial length of the outer ring is $L_2$, and $\theta_1=\theta_2$, that is, the inner ring and outer ring are each equally divided into 360/θ sections, with each section being a region for a cluster. For example, the size of the region for the cluster may be adjusted by adjusting at least one of $L_1$, $L_2$ and θ, and preferably, by adjusting $L_1$ and $L_2$. In addition, although a case of $\theta_1=\theta_2$ is shown in FIG. 9, values of θ for sections may be different from one another based on actual conditions.

Based on requirements of an actual application scenario, the coverage range may be divided into a different number of clusters by taking different values of θ. Preferably, θ∈[36°, 90°]. In this case, the number of clusters obtained by dividing based on such values of θ ranges from 8 to 20 inclusively. Exemplarily, a distance between gravity centers of two adjacent sectors obtained by dividing is preferably greater than a distance between two pairs of DUE-P multiplexing the same resources. The distance between gravity centers can ensure that interferences between the two sectors are controlled to be below a threshold. As can be seen, the greater the value of θ is, the less the clusters obtained by dividing are, the less the user equipments in different clusters multiplexing same resources are and the less the interferences are. On the contrary, the smaller the value of θ is, the more the clusters obtained by dividing are, the more the user equipments multiplexing the same resources are and the more apparent the system performance is improved. Therefore, if the number of user equipments in an application scenario is large and high resource utilization efficiency is expected, the value of θ may be as small as possible. If the number of user equipments in an application scenario is small and the user equipments are sensitive to interferences, the value of θ may be as great as possible. In the example in FIG. 9, assuming that θ=60°, 12 clusters are obtained by dividing, which is taken as an example for the description in the following.

Figure 10:
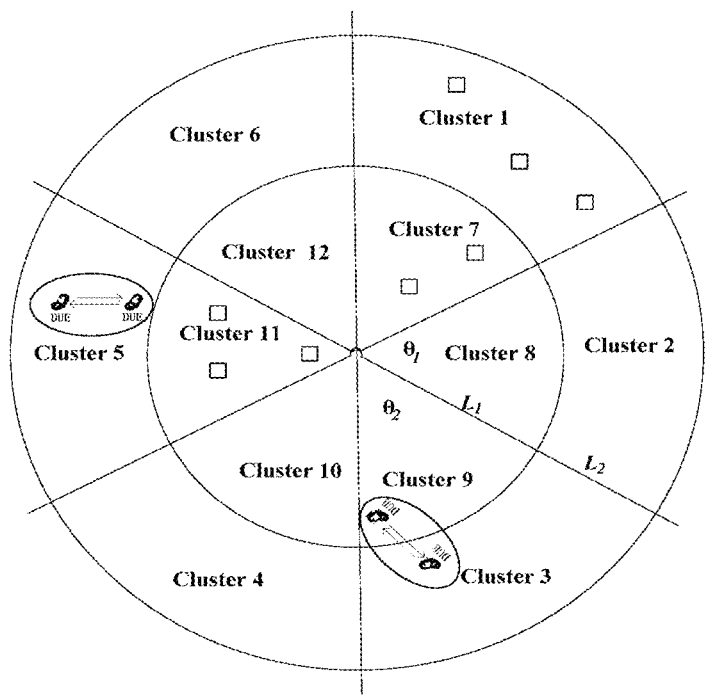
FIG. 10 is a schematic diagram showing that two D2D user equipments of a D2D user equipment pair are respectively located in different clusters.

A case that two DUEs of a part of DUE-Ps may be located in different clusters may occur in the regions obtained by such dividing, as shown in FIG. 10. For example, two DUES in a DUE-P are respectively located in cluster 3 and cluster 9. Thus, it is difficult for the one or more scheduling units 101 to determine which cluster the DUE-P belongs to. In this case, the DUE may autonomously select an available physical transmission resource. Alternatively, further determination may be performed to group the DUE into a certain cluster.

In an example, in the case that the number of D2D user equipment pairs in which two D2D user equipments are respectively located at different regions is more than a predetermined number, the dividing unit 201 may be further configured to adjust radial lengths of the rings to adjust the dividing for regions, so as to reduce the number of D2D user equipment pairs in each of which two D2D user equipments are respectively located in different regions. In other words, the number of the D2D user equipment pairs in each of which two D2D user equipments are respectively located in different regions, is reduced as much as possible by adjusting the dividing for regions.

A second timer (not shown in FIG. 10) may be further provided. The second timer expires when a time period for the above adjusting exceeds a predetermined value, to interrupt the above adjusting. If after the above adjusting, there is still a D2D user equipment pair where two D2D user equipments are respectively located in different regions, the D2D user equipment pairs autonomously select available physical transmission resources.

In another example, the one or more scheduling units 101 is further configured to: in the case that two D2D user equipment pairs are located in two different regions, determine, further based on a distance between the two D2D user equipment pairs, whether the two D2D user equipment pairs are capable of multiplexing same physical transmission resources, or in the case that a D2D user equipment pair and a cellular user equipment are located in two different regions, determine, further based on a distance between the D2D user equipment pair and the cellular user equipment, whether the D2D user equipment pair and the cellular user equipment are capable of multiplexing the same physical transmission resources.

For example, in the case that the above distance is less than a predetermined threshold, the one or more scheduling units 101 determine that the two D2D user equipment pairs use resource blocks orthogonal to one another, or that the D2D user equipment pair and the cellular user equipment use resource blocks orthogonal to one another. With such setting, strong interferences possible occurred at an edge between clusters may be avoided.

Taking FIG. 6 as an example, assuming that clusters 1-12 in FIG. 6 correspond to clusters 1-11 in FIG. 9, $d_{i-j}$ represents a distance between an i-th DUE-P and a j-th DUE-P (the two DUE-P are located in different clusters), and $D_{h-k}$ represents a distance between an h-th DUE-P and a k-th CUE (the h-th DUE-P and the k-th CUE are located in different clusters). Thresholds $d_Q$ and $D_Q$ may be set respectively. If $d_{i-j}>d_Q$, it is determined that the i-th DUE-P and the j-th DUE-P are capable of multiplexing the same physical transmission resources. If $D_{h-k}>D_Q$, it is determined that the h-th DUE-P and the k-th CUE are capable of multiplexing the same physical transmission resources.

If a user equipment list for the user equipments in FIG. 6 is generated based on the above standard, then the following operations may be performed. Firstly, DUE-P1 is added into the list. Then $d_{1-2}$ is compared with $d_Q$. If $d_{1-2}>d_Q$, DUE-P2 is added into the list. By further comparing, DUE-P1, DUE-P2 and DUE-P3 cannot multiplex same physical transmission resources if $d_{1-3}>d_Q$ and $d_{2-3}<d_Q$, DUE-P15 is added into the list if $d_{1-15}>d_Q$ and $d_{2-15}<d_Q$, and so on. If $d_{1-11}>d_Q$, $d_{2-11}>d_Q$, $d_{15-11}<d_Q$, ..., $d_{9-11}>d_Q$ and $d_{10-11}<d_Q$, DUE-P1, DUE-P2, DUE-P15, ..., DUE-P10 and DUE-P11 cannot multiplex same physical transmission resources. If $d_{1-23}>d_Q$, $d_{2-23}>d_Q$, $d_{15-23}>d_Q$, ..., $d_{9-23}>d_Q$ and $d_{10-23}<d_Q$, DUE-P1, DUE-P2, DUE-P15, ..., DUE-P10 and DUE-P23 cannot multiplex same physical transmission resources. If $D_{1-11}>D_Q$, $D_{2-11}>D_Q$, $D_{15-11}>D_Q$, ..., $D_{9-11}>D_Q$ and $D_{10-11}>D_Q$, DUE-P1, DUE-P2, DUE-P15, ..., DUE-P10 and CUE 11 are capable of multiplexing same physical transmission resources, and CUE 11 is added into the list. If $d_{1-12}>d_Q$, $d_{2-12}>d_Q$, $d_{15-12}>d_Q$, . . . , $d_{10-12}>d_Q$ and $D_{12-11}>D_Q$, DUE-P12 is added into the list, thereby obtaining a user equipment list shown in FIG. 11.

Figures 11, 12:
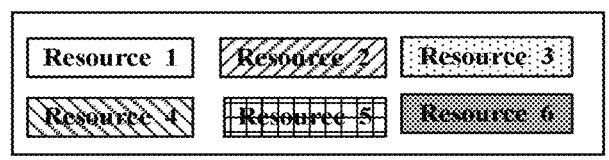
FIG. 11 is a diagram showing another example of a generated user equipment list.
FIG. 12 is a diagram showing an example of a result of resource allocation.

Multiple user equipment lists may be obtained by repeating the generating process of the user equipment list. The allocating module 1013 allocates a corresponding available physical transmission resource to the user equipments in the user equipment list. FIG. 12 shows an example of a final result of the resource allocation. A same fill pattern represents a corresponding relationship between a user equipment and a resource allocated for the user equipment. For example, a blank square represents user equipments in user equipment list 1 (i.e., the user equipment list in FIG. 11), to which resource 1 is allocated, and so on.

It should be noted that, in the example, each user equipment list includes at most one CUE.

In addition to determining based on the distance, the one or more scheduling units 101 may also determine whether multiple user equipments are capable of multiplexing the same physical transmission resources in the following way. Each region obtained by the dividing unit 201 is zoomed out to a certain extent from an edge of the region in a symmetrical manner, to obtain a center region, and the region other than the center region are taken as an edge region. In the case that two D2D user equipment pairs are located in respective edge regions of two different regions, it is determined that the two D2D user equipment pairs use physical transmission resources orthogonal to one another, or in the case that a D2D user equipment pair and a cellular user equipment are located in respective edge regions of two different regions, it is determined that the D2D user equipment pair and the cellular user equipment use physical transmission resources orthogonal to one another.

Figure 13:
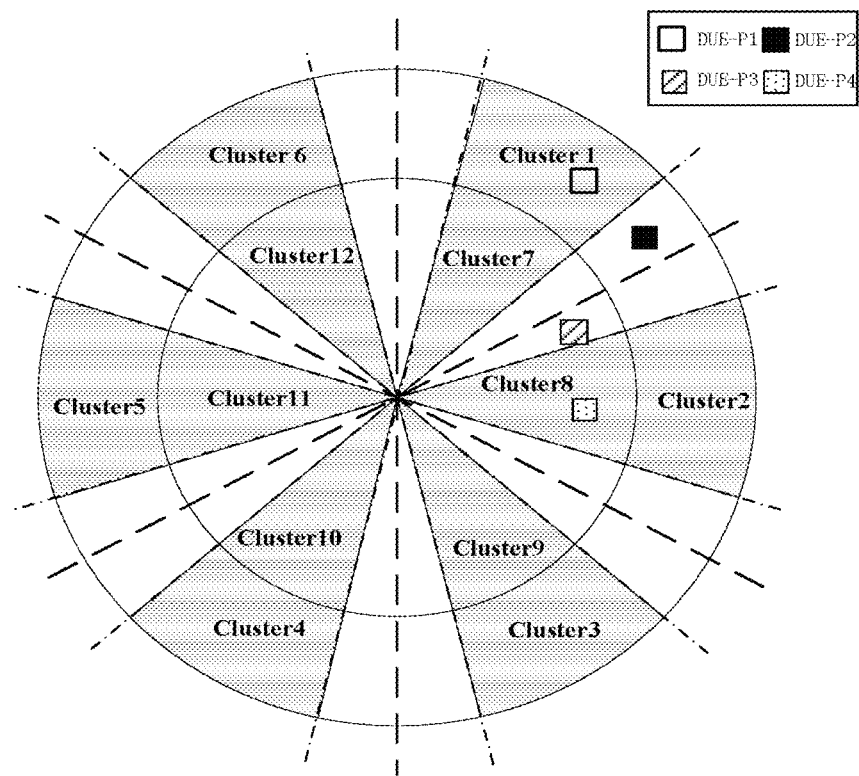
FIG. 13 is a schematic diagram showing division of an edge region and a center region.

For example, as shown in FIG. 13, a shadowed region represents a center region of a corresponding cluster and a blank region represents an edge region of the corresponding cluster. A hollow square represents DUE-P1, a solid square represents DUE-P2, a square filled with oblique lines represents DUE-P3, and a square filled with points represents DUE-P4. As can be seen, DUE-P1 is located in a center region of cluster 1, DUE-P2 is located in an edge region of cluster 1, DUE-P3 is located in an edge region of cluster 8 and DUE-P4 is located in a center region of cluster 8. Based on the configurations of the above one or more scheduling units 101, DUE-P1 and DUE-P3, DUE-P4 are capable of multiplexing same physical transmission resources, DUE-P2 and DUE-P4 are capable of multiplexing same physical transmission resources, and DUE P2 and DUE-P3 can only use physical transmission resources orthogonal to one another.

In another example, the one or more scheduling units 101 may further determine whether multiple user equipments are capable of multiplexing the same physical transmission resources in the following way. The region division obtained by the dividing unit 201 is rotated by a certain angle clockwise or anticlockwise while taking a location of the base station antenna as a center, to obtain a pseudo region division. If user equipments originally located in different regions of the region division currently belong to a same region of the pseudo region division, it is determined that the user equipments use physical transmission resources orthogonal to one another.

Figure 14:
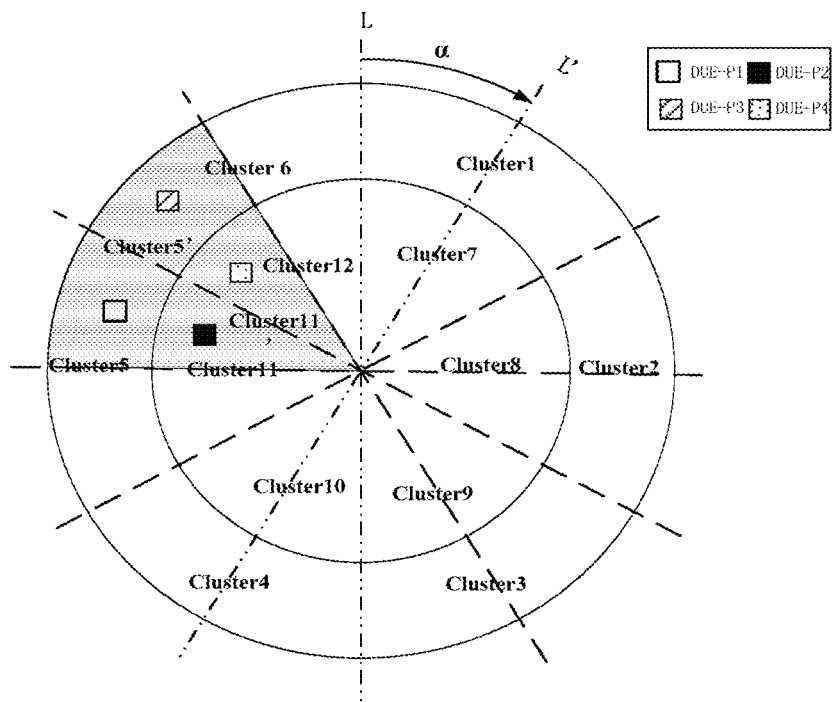
FIG. 14 is a schematic diagram of determining whether user equipments are capable of multiplexing the same physical transmission resources by rotating.

FIG. 14 shows an illustrative example of the configuration. In the example, the region division is rotated by an angle α clockwise, and for example, α is a half of θ1. DUE-P1 is located in cluster 5, DUE-P2 is located in cluster 11, DUE-P3 is located in cluster 6, and DUE-P4 is located in cluster 12. After the rotation, DUE-P1 and DUE-P3 are both located in cluster 5', and DUE-P2 and DUE-P4 are both located in cluster 11'. That is, after the rotation, DUE-P1 and DUE-P3 are located in a same cluster, and DUE-P2 and DUE-P4 are located in a same cluster. Therefore, based on the configurations of the above one or more scheduling units 101, physical transmission resources orthogonal to one another should be allocated to DUE-P1 and DUE-P3, and physical transmission resources orthogonal to one another should be allocated to DUE-P2 and DUE-P4.

It should be noted that, in the example, the rotation is only a means for determining. The one or more scheduling units 101 still performs resource scheduling based on the clusters obtained by dividing before the rotation.

Figure 15:
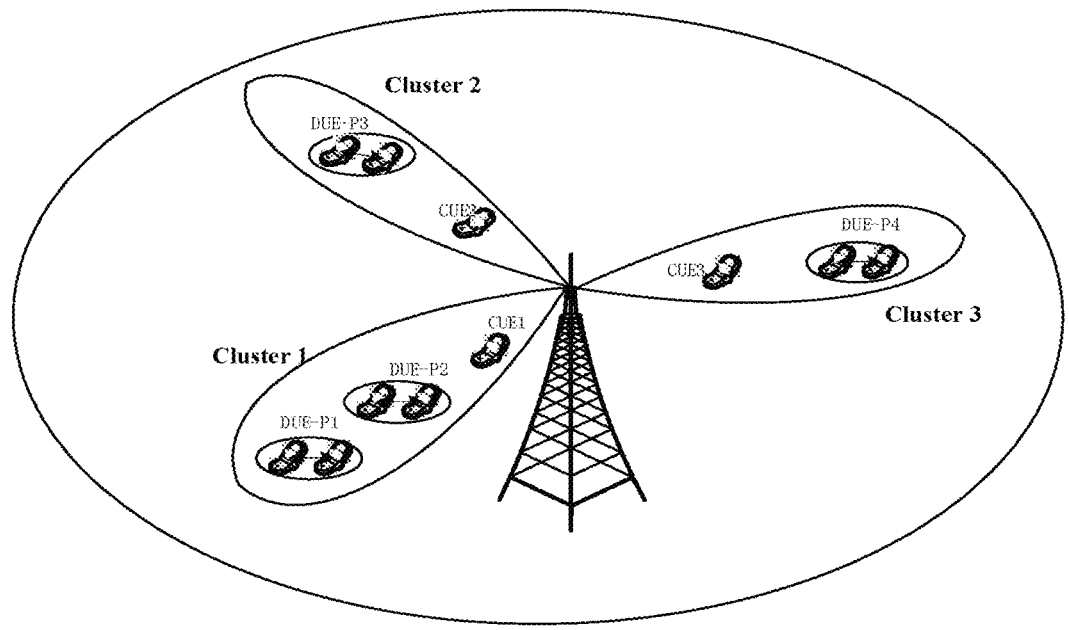
FIG. 15 is a schematic diagram showing division of clusters in the case of beam forming.

In addition, the dividing unit 201 may be further configured to divide user equipments within coverage of a same beam/lobe into one user equipment cluster in the case of beam forming (for example, the apparatus 200 are provided with multiple antennas, and a beam forming transmission scheme is adopted to reduce communication interferences). For example, as shown in FIG. 15, CUE1, DUE-P1, DUE-P2 are located within coverage of a same beam, and are grouped into cluster 1, CUE2 and DUE-P3 are located within coverage of a same beam and are grouped into cluster 2, CUE3 and DUE-P4 are located within coverage of a same beam and are grouped into cluster 3. In some specific embodiments, the apparatus 200 determines/adjusts configurations related to multi-antenna based on a distribution of D2D user equipment pairs, for example, the apparatus determines a specific pre-coding matrix for a user equipment to make the user equipment be located within beam coverage, and performs corresponding clustering and resource scheduling. Preferably, each antenna beam covers as many D2D user equipment pairs as possible. In the beam forming transmission scheme, signal energy is concentrated in the beams, and thus no interferences occur between beams transmission. Based on this feature, same transmission resources are allocated to user equipments within coverage of different beams according to the present disclosure.

Figure 16:
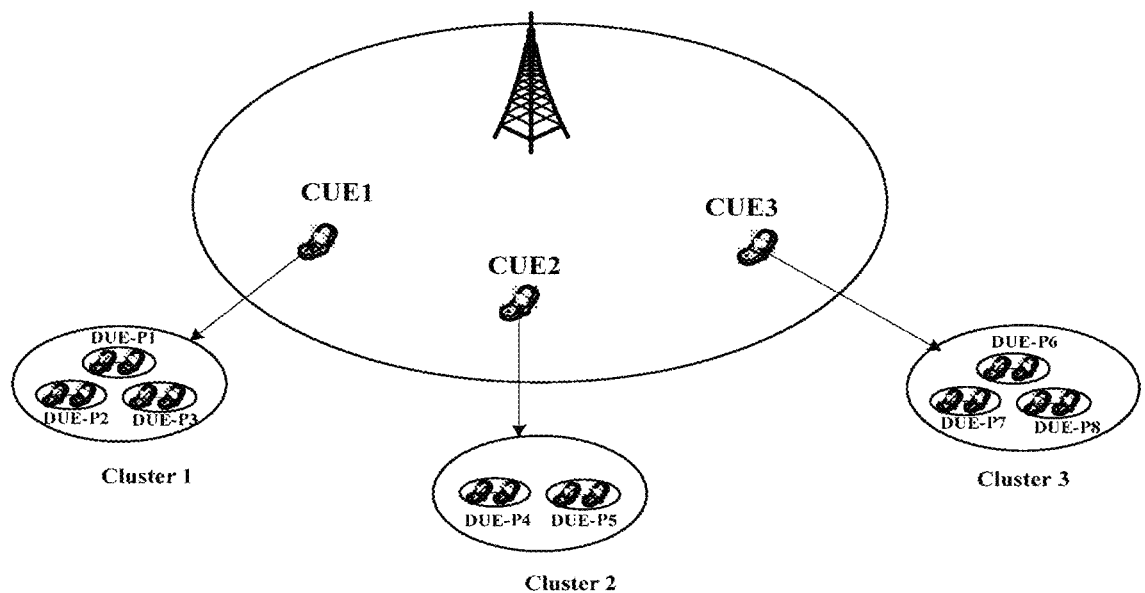
FIG. 16 is a schematic diagram showing division of clusters of user equipments outside of a coverage range.

As another example, the dividing unit 201 may be further configured to group a user equipment within the coverage range and user equipments which are located outside of the coverage range and receive a synchronization signal and control signaling from the user equipment within the coverage range into one user equipment cluster. For example, as shown in FIG. 16, all of DUE-P1, DUE-P2, . . . , DUE-P7 and DUE-P8 are located outside of the coverage range, and CUE1, CUE2 and CUE 3 are located within the coverage range. DUE-P1, DUE-P2, DUE-P3 receive a synchronization signal and control signaling transmitted from CUE1, and DUE-P1, DUE-P2, DUE-P3 and CUE1 are grouped into cluster 1. DUE-P4 and DUE-PS receive a synchronization signal and control signaling transmitted from CUE2, and DUE-P4, DUE-PS and CUE2 are grouped into cluster 2. DUE-P6, DUE-P7 and DUE-P8 receive a synchronization signal and control signaling transmitted from CUE3, and DUE-P6, DUE-P7, DUE-P8 and CUE3 are grouped into cluster 3.

In some examples, the apparatus 100 and the apparatus 200 operate as a base station. In other examples, the apparatus 100 and the apparatus 200 may further operate as a component such as a processing chip within a base station.

Third Embodiment

An apparatus on a user equipment side in a communication system is further provided according to an embodiment of the present disclosure. The apparatus includes one or more processors configured to parse control signaling from a base station and determine a DP-RNTI for the apparatus, and perform blind detection on a physical downlink control channel (PDCCH) from the base station using the DP-RNTI, to detect downlink control information for the apparatus and determine a physical transmission resource scheduled by the base station for the apparatus, where the physical transmission resource is used for D2D communication between the user equipment and another user equipment, and the user equipment and at least another D2D user equipment managed by the base station share the DP-RNTI.

Figure 17:
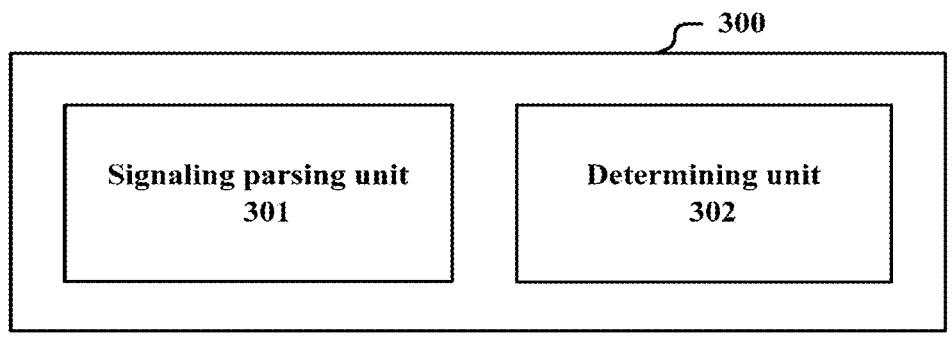
FIG. 17 is a structural block diagram showing a specific example of an apparatus on a user equipment side in a communication system according to an embodiment of the present application.

Correspondingly, FIG. 17 shows a structural block diagram of an example of the apparatus. As shown in FIG. 17, the apparatus 300 includes: a signaling parsing unit 301 configured to parse control signaling from a base station and determine a DP-RNTI for the apparatus; and a determining unit 302 configured to perform blind detection on a physical downlink control channel (PDCCH) from the base station using the DP-RNTI, to detect downlink control information for the apparatus and determine a physical transmission resource scheduled by the base station for the apparatus. The physical transmission resource is used for D2D communication between the user equipment and another user equipment, and the user equipment and at least another D2D user equipment managed by the base station share the DP-RNTI.

For example, the user equipment is a D2D user equipment which receives, from a base station, an instruction of a DP-RNTI configured by the base station for the user equipment. In an example, the instruction may be received through RRC signaling, and can be used to determine the DP-RNTI for the apparatus. For example, the D2D user equipment receives the RRC signaling from the base station, and parses the RRC signaling to obtain the DP-RNTI, then detects and descrambles in a searching space of the PDCCH using the DP-RNTI, to obtain DCI and determines resource scheduling information and other information. Based on the information, the user equipment may perform D2D communication with other user equipments.

In another example, the user equipment may receive an instruction of a DP-RNTI transmitted from the base station by receiving a MAC CE of MAC signaling. In other words, a new MAC CE, that is, DP-RNTI MAC CE may be defined. The user equipment parses the new MAC CE, to obtain the DP-RNTI configured for itself, subsequent operations are the same as those described in the above examples and not repeated here.

The above RRC signaling notification manner and MAC signaling notification manner are semi-static, and a dynamic manner may also be adopted. For example, the user equipment may receive the above instruction of the DP-RNTI via a PDCCH, for example, the base station may transmit a DP-RNTI currently configured for the user equipment via a previous PDCCH.

In addition, the user equipment may further receive the instruction of the DP-RNTI by receiving broadcasting. The broadcasted information contains an ID of each of user equipments and a DP-RNTI corresponding to the user equipment. The user equipment searches the broadcasting information for the ID of itself, so as to acquire the DP-RNTI configured for itself.

In the case that a location of the user equipment changes in a predetermined way, the base station may reallocate a DP-RNTI to the user equipment. For example, in the case that the location of the user equipment changes beyond a region of a geographical location corresponding to a user equipment cluster which the user equipment originally belong to, the base station may reconfigure a DP-RNTI for the user equipment and transmit the DP-RNTI in one of the above manners, and the user equipment acquires the new DP-RNTI again. Then, the base station performs resource scheduling based on the new DP-RNTI.

In some examples, the above apparatus 300 operates as a user equipment. In other examples, the above apparatus may operate as a component such as a processing chip within a user equipment.

Fourth Embodiment

In the process of describing the apparatus for wireless communications in the embodiments described above, obviously, some processing and methods are also disclosed. Hereinafter, an overview of the methods is given without repeating some details disclosed above. However, it should be noted that, although the methods are disclosed in a process of describing the apparatus for wireless communications, the methods do not certainly employ or are not certainly executed by the aforementioned components. For example, the embodiments of the apparatus for wireless communications may be partially or completely implemented with hardware and/or firmware, the method for wireless communications described below may be executed by a computer-executable program completely, although the hardware and/or firmware of the electronic device can also be used in the methods.

Figure 18:
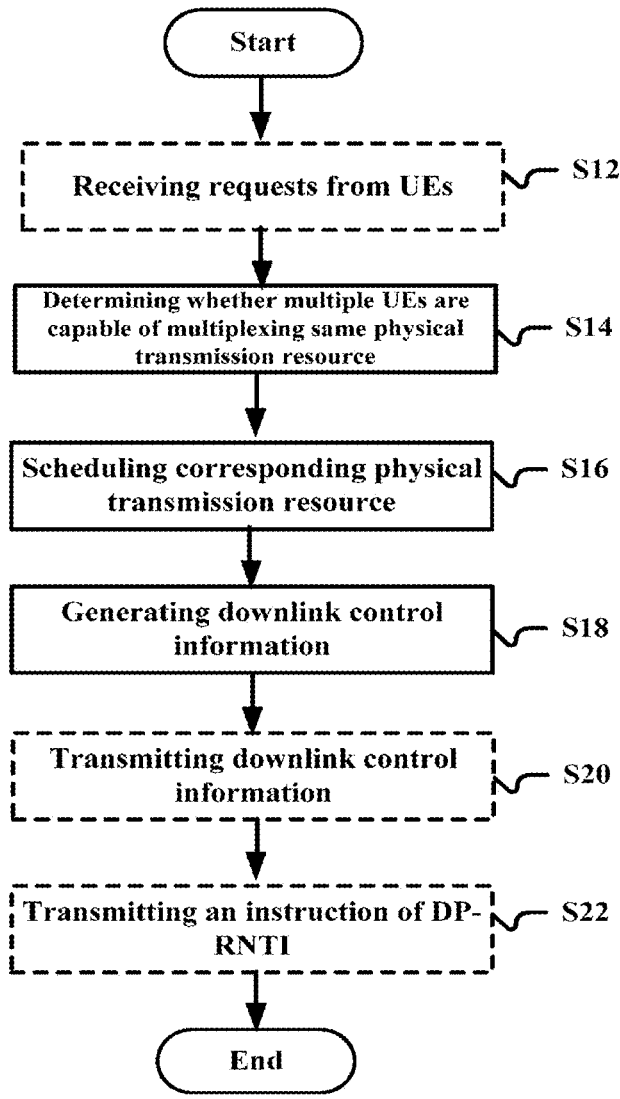
FIG. 18 is a flowchart of a method for wireless communications according to an embodiment of the present application.

FIG. 18 shows a flowchart of a method for wireless communications according to an embodiment of the present disclosure. The method includes: in response to transmission requirements of multiple user equipments, determining, based on user equipment clusters which the multiple user equipments belong to, whether the multiple user equipments are capable of multiplexing same physical transmission resources (S14); scheduling corresponding physical transmission resources for the user equipments based on a result of the determining (S16); and generating, based on the resources scheduling, downlink control information containing resource scheduling information, to be used for the user equipments (S18); where the user equipments include D2D user equipment pairs and cellular user equipments, and the multiple user equipments are grouped into at least one user equipment cluster based on geographical locations in advance.

As an example, in step S14, determining may be performed based on the following principle: user equipments in a same cluster use physical transmission resources orthogonal to one another, and user equipments in different clusters multiplex same physical transmission resource.

The resource scheduling in step S16 includes allocating physical resource blocks. Same physical resource blocks are scheduled for at least part of the multiple user equipments. Moreover, in step S18, same downlink control information is generated for the user equipments multiplexing the same physical resource blocks and is mapped to same physical downlink control channel PDCCH resources.

In step S18, a same DP-RNTI is configured for D2D user equipment pairs multiplexing same physical resource blocks, and downlink control information is scrambled using the DP-RNTI.

In the case that a cellular user equipment and a D2D user equipment pair multiplex a resource block, the DP-RNTI is configured to be the same as a C-RNTI of the cellular user equipment in step S18. In practice, the DP-RNTI may also be configured to be different from the C-RNTI of the cellular user equipment, which is described in detail in the first embodiment and is not repeated here.

In addition, as shown by a dashed-line box in FIG. 18, the method may further include step S22: transmitting an instruction of a DP-RNTI configured for the part of the user equipments to the part of the user equipments. RRC signaling for the corresponding user equipments may be generated in step S18. The RRC signaling contains the instruction of the DP-RNTI configured for the user equipments.

In another example, the above method further includes step S12: receiving requests for using physical transmission resources from multiple user equipments. The subsequent steps are performed in response to the receiving of the requests. Further, the method further includes step S20: transmitting downlink control information to the multiple user equipments.

Figure 19:
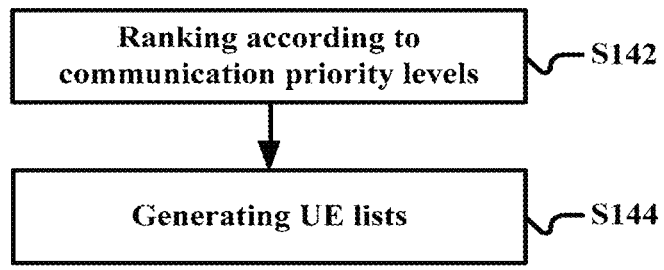
FIG. 19 is a flowchart of substeps of step S14 in FIG. 18.

FIG. 19 shows a particular example of step S14. Step S14 includes the following sub-steps: ranking the user equipments from which the requests are received according to communication priority levels of the user equipments (S142); and generating user equipment lists, user equipments in each of which are capable of multiplexing same physical transmission resources (S144), where the user equipments are filled into the user equipment list based on a sequence of the priority levels.

Correspondingly, each available physical transmission resource is allocated to the user equipments in each of the generated user equipment lists in step S16.

As an example, a timer may be started while performing step S144. The timer is provided for each of the available physical transmission resources. When the timer expires, performing of step S144 is stopped, and step S16 is performed to allocate the available physical transmission resource to the user equipments in the corresponding user equipment list.

In the above method, a coverage range of an the base station antenna serving the user equipments can be divided into several regions based on geographical locations, and user equipments in each region are grouped into one user equipment cluster. The grouping of user equipment clusters may be performed in advance and relatively fixedly, for example, is only performed on initialization.

As an example, the following operations are performed in step S14: in the case that two D2D user equipment pairs are located in two different regions, determining, based on a distance between the two D2D user equipment pairs, whether the two user equipment pairs are capable of multiplexing same physical transmission resources, or in the case that a D2D user equipment pair and a cellular user equipment are located in two different regions, determining, based on a distance between the D2D user equipment pair and the cellular user equipment, whether the D2D user equipment pair and the cellular user equipment are capable of multiplexing same physical transmission resources. For example, if the distance is greater than a predetermined threshold, it is determined that the two D2D user equipment pairs are capable of multiplexing the same physical transmission resources, or the D2D user equipment pair and the cellular user equipment are capable of multiplexing the same physical transmission resources. Otherwise, if the distance is not greater than a predetermined threshold, it is determined that the two D2D user equipment pairs are not capable of multiplexing the same physical transmission resources, or the D2D user equipment pair and the cellular user equipment are not capable of multiplexing the same physical transmission resources.

The following operation may be further performed in step S14. grouping user equipments within coverage of a same beam into one user equipment cluster in the case of beam forming In addition, the following operation may be further performed in step S14: grouping a user equipment within a coverage range and user equipments which are located outside of the coverage range and receive a synchronization signal and control signaling from the user equipment within the coverage range into one user equipment cluster.

Figure 20:
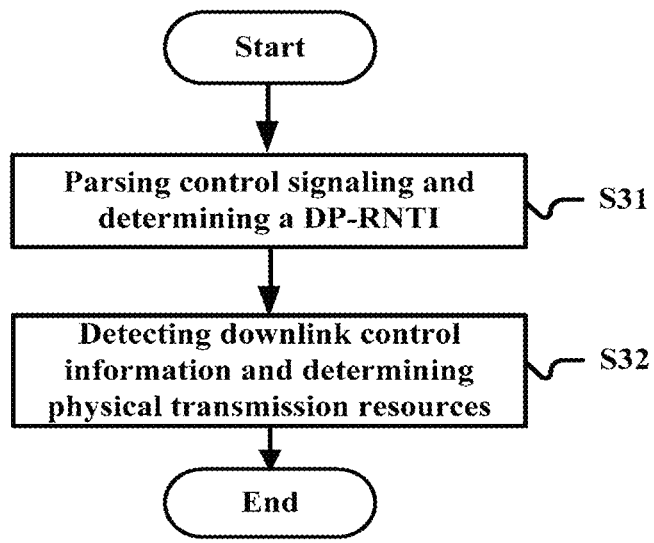
FIG. 20 is a flowchart of a method on a user equipment side in a communication system according to an embodiment of the present application.

FIG. 20 shows a method on a user equipment side in a communication system according to an embodiment of the present disclosure. The method includes: parsing control signaling from a base station and determining a DP-RNTI for the apparatus (S31); performing blind detection on a physical downlink control channel (PDCCH) from the base station using the DP-RNTI, to detect downlink control information for the apparatus and determine a physical transmission resource scheduled by the base station for the apparatus (S32); where the physical transmission resource is used for D2D communication between the user equipment and another user equipment, and the user equipment and at least another D2D user equipment managed by the base station share the DP-RNTI.

It is to be noted that, the above methods can be used separately or in conjunction with each other. The details have been described in detail in the first to third embodiments, and are not repeatedly described here.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It can be understood by those skilled in the art that, for example, the one or more scheduling units, the signaling generating unit, the dividing unit, the timer and the like in the above apparatus can be implemented by one or more processors. The transceiving unit and the like can be implemented by a circuit element such as an antenna, a filter, a modem and a codec.

Therefore, an electronic device (1) is further provided in the present disclosure. The electronic device (1) includes circuitry configured to: in response to transmission requirements of multiple user equipments, determine, based on user equipment clusters which the multiple user equipments belong to, whether the multiple user equipments are capable of multiplexing same physical transmission resources; schedule physical transmission resources for the multiple user equipments based on a result of the determining; and generate, based on the resource scheduling, downlink control information containing resource scheduling information, to be used for the multiple user equipments; where the user equipments include D2D user equipment pairs and cellular user equipments, and the multiple user equipments are grouped into at least one user equipment cluster based on geographical locations in advance.

An electronic device (2) is further provided in the present disclosure. The electronic device (2) includes circuitry configured to: parse control signaling from a base station and determine a DP-RNTI for the electronic device, and perform blind detection on a physical downlink control channel (PDCCH) from the base station using the DP-RNTI, to detect downlink control information for the electronic device and determine a physical transmission resource scheduled by the base station for the electronic device, where the physical transmission resource is used for D2D communication between the user equipment electronic device and another user equipment, and the user equipment and at least another D2D user equipment managed by the base station share the DP-RNTI.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 2100 shown in FIG. 21) from a storage medium or network, wherein the computer is capable of implementing various functions when installed with various programs.

Figure 21:
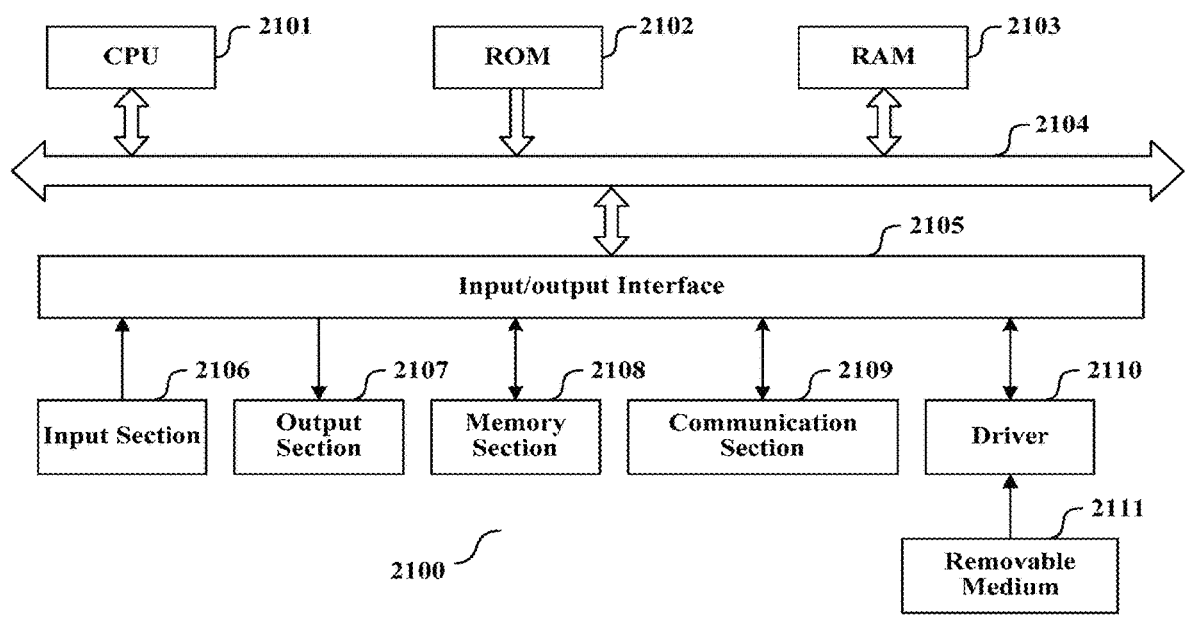
FIG. 21 is an exemplary block diagram illustrating the structure of a general purpose personal computer capable of realizing the method and/or device and/or system according to the embodiments of the present invention.

In FIG. 21, a central processing unit (CPU) 2101 executes various processing according to a program stored in a read-only memory (ROM) 2102 or a program loaded to a random access memory (RAM) 2103 from a memory section 2108. The data needed for the various processing of the CPU 2101 may be stored in the RAM 2103 as needed. The CPU 2101, the ROM 2102 and the RAM 2103 are linked with each other via a bus 2104. An input/output interface 2105 is also linked to the bus 2104.

The following components are linked to the input/output interface 2105: an input section 2106 (including keyboard, mouse and the like), an output section 2107 (including displays such as a cathode ray tube (CRT), a liquid crystal display (LCD), a loudspeaker and the like), a memory section 2108 (including hard disc and the like), and a communication section 2109 (including a network interface card such as a LAN card, modem and the like). The communication section 2109 performs communication processing via a network such as the Internet. A driver 2110 may also be linked to the input/output interface 2105. If needed, a removable medium 2111, for example, a magnetic disc, an optical disc, a magnetic optical disc, a semiconductor memory and the like, may be installed in the driver 2110, so that the computer program read therefrom is installed in the memory section 2108 as appropriate.

In the case where the foregoing series of processing is achieved by software, programs forming the software are installed from a network such as the Internet or a memory medium such as the removable medium 2111.

It should be appreciated by those skilled in the art that the memory medium is not limited to the removable medium 2111 shown in FIG. 21, which has program stored therein and is distributed separately from the apparatus so as to provide the programs to users. The removable medium 2111 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2102 and the memory section 2108 in which programs are stored, and can be distributed to users along with the device in which they are incorporated.

The technology of the present disclosure is applicable to various products. For example, the apparatuses 100 and 200 may be realized as any type of evolved Node B (eNB) such as a macro eNB and a small eNB. The small eNB may be an eNB such as a pico eNB, a micro eNB, and a home (femto) eNB that covers a cell smaller than a macro cell. Instead, the apparatus 100 and 200 may be realized as any other types of base stations such as a NodeB and a base transceiver station (BTS). The apparatus 100 and 200 may include a main body (that is also referred to as a base station apparatus) configured to control radio communication, and one or more remote radio heads (RRH) disposed in a different place from the main body. In addition, various types of terminals, which will be described below, may each operate as the apparatus 100 and 200 by temporarily or semi-persistently executing a base station function.

For example, the apparatus 300 may be realized as a mobile terminal such as a smartphone, a tablet personal computer (PC), a notebook PC, a portable game terminal, a portable/dongle type mobile router, a digital camera and a car, or an in-vehicle terminal such as a car navigation apparatus. The apparatus 300 may also be realized as a terminal (that is also referred to as a machine type communication (MTC) terminal) that performs machine-to-machine (M2M) communication. Furthermore, the apparatus 300 may be a radio communication module (such as an integrated circuit module including a single die) mounted on each of the terminals.

Application examples of an eNB and a user equipment in which the technology according to the present disclosure is applied are described below.

[I. Application Example Regarding a Base Station]

Figure 22:
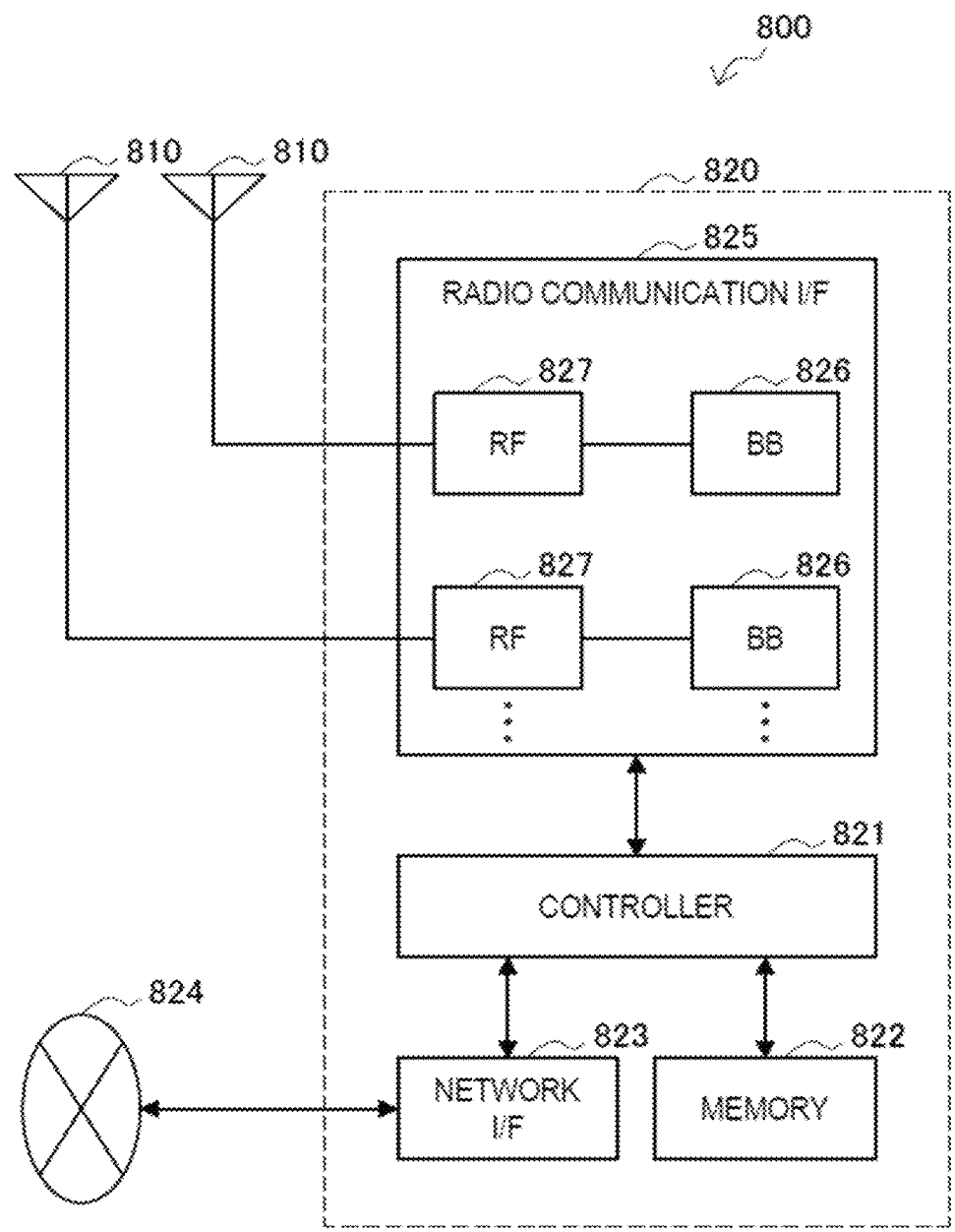
FIG. 22 is a block diagram showing an example of a schematic configuration of an evolved Node B (eNB) in which the technology according to the present disclosure is applied.

FIG. 22 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 22. For example, the multiple antennas 810 may be compatible with multiple frequency bands used by the eNB 800. Although FIG. 22 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 22. For example, the multiple BB processors 826 may be compatible with multiple frequency bands used by the eNB 800. The radio communication interface 825 may include the multiple RF circuits 827, as illustrated in FIG. 22. For example, the multiple RF circuits 827 may be compatible with multiple antenna elements. Although FIG. 22 illustrates the example in which the radio communication interface 825 includes the multiple BB processors 826 and the multiple RF circuits 827, the radio communication interface 825 may also include a single BB processor 826 or a single RF circuit 827.

In the eNB 800 and eNB 830 shown in FIG. 22, the transceiving unit described with reference to FIG. 1 and FIG. 8 may be implemented by the radio communication interface 825 and the radio communication interface 855 and/or the radio communication interface 863. At least a part of the functions may also be implemented by the controller 821 and the controller 851. For example, the controller 821 and the controller 825 may schedule physical transmission resources based on user equipment clusters to which user equipments belong by executing functions of the one or more scheduling units. The controller 821 and the controller 825 may generate downlink control information by executing functions of the signaling generating unit. The controller 821 and the controller 825 may perform dividing of user equipment clusters by performing functions of the dividing unit. The controller 821 and the controller 825 may further control the timing for allocating physical transmission resource blocks by executing the functions of the timer.

[II. Application Example Regarding a User Equipment]

Figure 23:
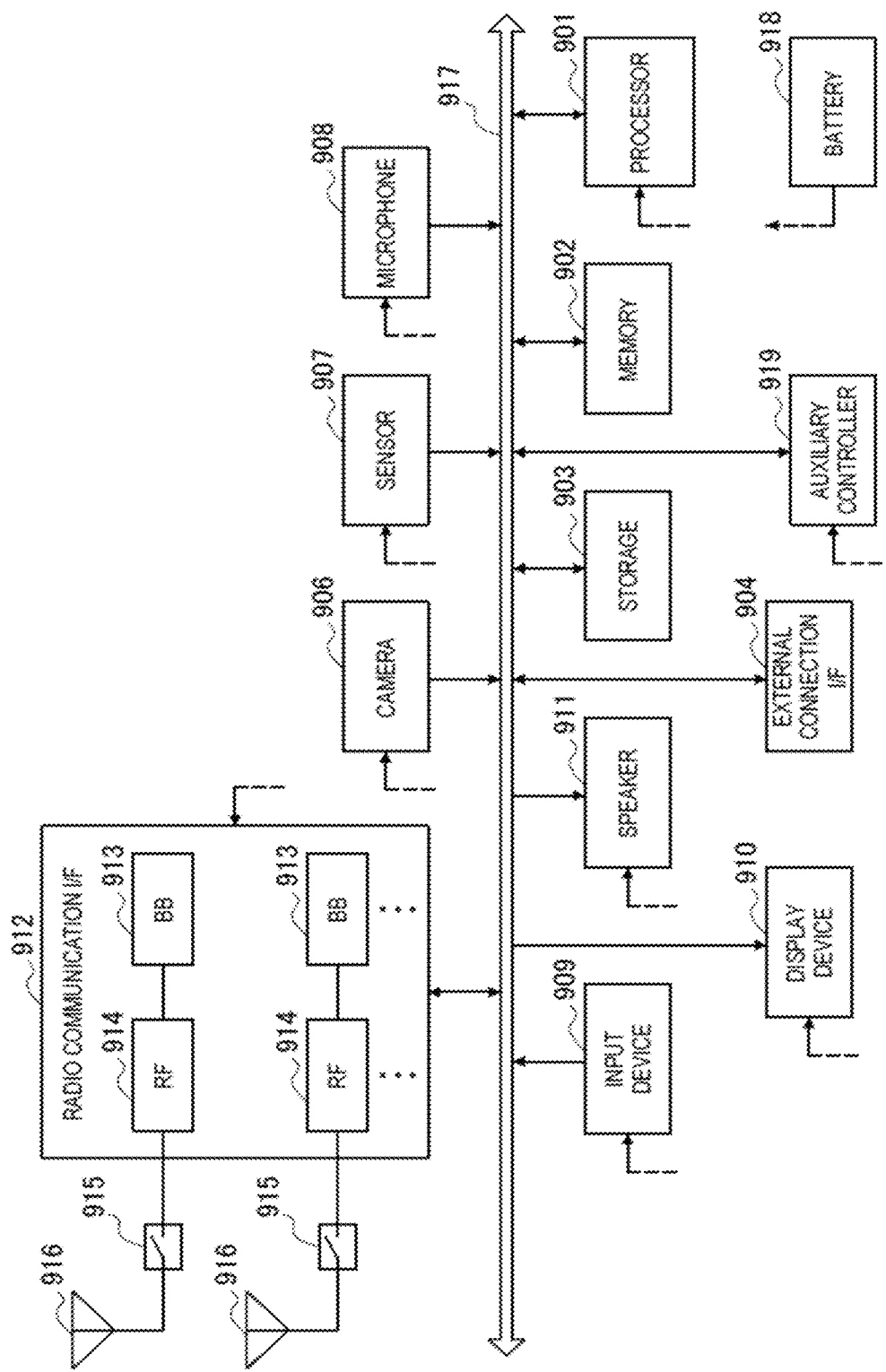
FIG. 23 is a block diagram showing an example of a schematic configuration of an application example of user equipments.

FIG. 23 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LET and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 23. Although FIG. 23 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 23. Although FIG. 23 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 23 via feeder lines, which are partially shown as dashed lines in the figure. The auxiliary controller 919 operates a minimum necessary function of the smartphone 900, for example, in a sleep mode.

In the smart phone 900 shown in FIG. 23, the processor 901 or the auxiliary controller 919 may parse the control signaling to determine the DP-RNTI by executing functions of the signaling parsing unit. The processor 901 or the auxiliary controller 919 may detect downlink control information and determine physical transmission resources scheduled for user equipments by executing functions of the determining unit.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for wireless communications, comprising:
   one or more schedulers, configured to: in response to transmission requirements of a plurality of user equipments managed by the apparatus, determine, based on user equipment clusters which the plurality of user equipments belong to, whether the plurality of user equipments are capable of multiplexing same physical transmission resources; and schedule corresponding physical transmission resources for the plurality of user equipments based on a result of determining; and
   a signaling generator, configured to generate, based on the resources scheduling of the one or more schedulers, downlink control information containing resource scheduling information to be used for the plurality of user equipments,
   wherein the user equipments comprise D2D user equipment pairs and cellular user equipments, and the plurality of user equipments are grouped into at least one user equipment cluster based on geographical locations in advance,
   wherein the signaling generator is further configured to configure a same DP-RNTI for the D2D user equipment pairs multiplexing the same physical resource blocks, and scramble the downlink control information with the DP-RNTI, and
   wherein in the case that a cellular user equipment and a D2D user equipment pair multiplex resource blocks, the signaling generator is configured to configure the DP-RNTI to be the same as a C-RNTI of the cellular user equipment.

2. The apparatus according to claim 1, wherein the resource scheduling comprises allocating of physical resource blocks, and the one or more schedulers are configured to schedule same physical resource blocks for at least part of the plurality of user equipments, and the signaling generator is further configured to generate same downlink control information for the user equipments multiplexing the same physical resource blocks and map the downlink control information onto same physical downlink control channel (PDCCH) resources.

3. The apparatus according to claim 1, further comprising:
   a transceiver, configured to transmit, to the part of the plurality of user equipments, an instruction of the DP-RNTI configured for the part of the plurality of user equipments.

4. The apparatus according to claim 3, wherein the signaling generator is further configured to generate RRC signaling for the corresponding user equipments, with the RRC signaling containing the instruction of the DP-RNTI configured for the user equipments.

5. The apparatus according to claim 1, further comprising:
   a divider, configured to divide a coverage range of a base station antenna serving the user equipments into a plurality of regions according to geographical locations, and take the user equipments in each of the plurality of regions as one user equipment cluster.

6. The apparatus according to claim 5, wherein the one or more schedulers are further configured to: in the case that two D2D user equipment pairs are located in two different regions, determine, further based on a distance between the two D2D user equipment pairs, whether the two D2D user equipment pairs are capable of multiplexing same physical transmission resources, or in the case that the D2D user equipment pair and the cellular user equipment are located in two different regions, determine, further based on a distance between the D2D user equipment pair and the cellular user equipment, whether the D2D user equipment pair and the cellular user equipment are capable of multiplexing same physical transmission resources.

7. The apparatus according to claim 5, wherein the divider is configured to group the user equipments within coverage of a same beam into one user equipment cluster in the case of beamforming.

8. The apparatus according to claim 5, wherein the divider is configured to group a user equipment within the coverage range and user equipments which are located outside of the coverage range and receive a synchronization signal and control signaling from the user equipment within the coverage range into one user equipment cluster.

9. The apparatus according to claim 1, further comprising:
a transceiver, configured to receive requests for using physical transmission resources from the plurality of user equipments and transmit the downlink control information to the plurality of user equipments.

10. The apparatus according to claim 9, wherein the one or more schedulers comprise:
a ranker, configured to rank the user equipments from which the requests are received according to communication priority levels of the user equipments;
a user equipment list generator, configured to generate user equipment lists, the user equipments in each of which are capable of multiplexing same physical transmission resources, wherein the user equipments are filled into the user equipment list according to a sequence of the priority levels; and
an allocator, configured to allocate available physical transmission resources to the user equipments in each of the generated user equipment lists respectively.

11. The apparatus according to claim 10, wherein the one or more schedulers further comprise:
a timer provided for each of the available physical transmission resources, and when the timer expires, the user equipment list generator stops the generating of the corresponding user equipment list, and the allocator allocates the available physical transmission resource to the user equipments in the user equipment list.

12. A method for wireless communications, comprising:
in response to transmission requirements of a plurality of user equipments, determining, based on user equipment clusters which the plurality of user equipments belong to, whether the plurality of user equipments are capable of multiplexing same physical transmission resources;
scheduling, based on a result of the determining, physical transmission resources for the plurality of user equipments;
generating, based on the resources scheduling, downlink control information containing resource scheduling information to be used for the plurality of user equipments;
wherein the user equipments comprise D2D user equipment pairs and cellular user equipments, and the plurality of user equipments are grouped into at least one user equipment cluster based on geographical locations in advance; and
configuring a same DP-RNTI for the D2D user equipment pairs multiplexing the same physical resource blocks, and scrambling the downlink control information with the DP-RNTI,
wherein in the case that a cellular user equipment and a D2D user equipment pair multiplex resource blocks, configuring the DP-RNTI to be the same as a C-RNTI of the cellular user equipment.

13. A base station comprising the apparatus according to claim 1.

14. An apparatus on a user equipment side in a communication system, comprising:
one or more processors, configured to:
parse control signaling from a base station and determine a DP-RNTI for the apparatus, and
perform blind detection on a physical downlink control channel (PDCCH) from the base station using the DP-RNTI, to detect downlink control information for the apparatus and determine physical transmission resources scheduled by the base station for the apparatus,
wherein the physical transmission resources are used for a D2D communication between the user equipment and another user equipment, and the user equipment and at least another D2D user equipment managed by the base station share the DP-RNTI,
wherein a same DP-RNTI is configured for D2D user equipment pairs multiplexing the same physical resource blocks, and the downlink control information is scrambled with the DP-RNTI, and
wherein in the case that a cellular user equipment and a D2D user equipment pair multiplex resource blocks, the DP-RNTI is configured to be the same as a C-RNTI of the cellular user equipment.

* * * * *